United States Patent [19]
Kao

[11] Patent Number: 6,085,405
[45] Date of Patent: Jul. 11, 2000

[54] METHOD OF FABRICATING A HANDLEBAR STEM FOR A BICYCLE

[76] Inventor: Cheng-Hsien Kao, 2, Alley 1, Lane 29, Sec. 2, Pei-Shin Rd., Shin-Tien City, Taipei Hsien, Taiwan

[21] Appl. No.: 09/153,453

[22] Filed: Sep. 15, 1998

[51] Int. Cl.⁷ .............. B23P 13/00; B21C 23/18
[52] U.S. Cl. .............. 29/558; 29/557; 72/267; 72/334; 72/356; 72/377
[58] Field of Search .............. 29/557, 558; 72/256, 72/267, 356, 377, 334; 269/13, 14, 47, 48

[56] References Cited

U.S. PATENT DOCUMENTS

| | | | |
|---|---|---|---|
| 1,419,346 | 6/1922 | Anderson | 72/334 |
| 1,802,843 | 4/1931 | Singer | 72/256 |
| 2,789,344 | 4/1957 | Kaul | 72/256 |
| 3,170,235 | 2/1965 | Williams | 72/256 |
| 3,186,209 | 6/1965 | Friedman | 72/334 |
| 3,247,698 | 4/1966 | Baldwin et al. | 72/334 |
| 4,416,141 | 11/1983 | Nippert | 72/356 X |
| 4,918,969 | 4/1990 | Takeuchi et al. | 72/334 |
| 4,967,584 | 11/1990 | Sato et al. | 72/356 |
| 5,129,251 | 7/1992 | Takikawa | 72/334 |

FOREIGN PATENT DOCUMENTS

| | | | |
|---|---|---|---|
| 0202735 | 9/1986 | Japan | 29/897.2 |
| 1238869 | 6/1986 | U.S.S.R. | 72/334 |

*Primary Examiner*—S. Thomas Hughes
*Assistant Examiner*—Eric Compton
*Attorney, Agent, or Firm*—Varndell & Varndell, PLLC

[57] ABSTRACT

A handlebar stem fabrication method includes the steps of (a) selecting a metal ingot subject to the cavity of a first forming die and then operating the first forming die to process the selected metal ingot into an embryonic form having a front end section, (b) operating a second forming die to process the embryonic form into an initially processed form having a middle body section integral with the front end section, (c) operating a third forming die to processing the initially processed form into a secondarily processed form having a hollow rear end with a closed bottom wall and a rear end lug raised from the periphery of the hollow rear end, and (d) processing the secondarily processed form a finished handlebar stem by: cutting the closed bottom wall away from the hollow rear end of the secondarily processed form, making a split at the hollow rear end of the secondarily processed form to separate the rear end lug into two separated lugs, and then drilling two vertically spaced mounting holes at the two separated lugs.

5 Claims, 9 Drawing Sheets

METHOD OF FABRICATING A HANDLEBAR STEM FOR A BICYCLE

BACKGROUND OF THE INVENTION

1. Field of the Invention

The present invention related to a method of fabricating a handlebar stem for a bicycle, and more particularly to such a handlebar stem fabrication method which greatly saves material and labor consumption, and greatly reduces the manufacturing cost

2. Description of the Prior Art

According to conventional bicycle handlebar stem fabrication methods, a bicycle handlebar stem can be made in integrity by forging, or by welding two separately made tubular members into shape. A bicycle handlebar stem made in integrity by forging has an integrated outside wall and high structural strength, and needs not to receive a surface treating process. A bicycle handlebar stem made by welding two separately made tubular members into shape is less strong. Further, the welding process is complicated. However, when making bicycle handlebar stem in integrity by forging, much waste material is produced. It is important to find a method of fabricating a bicycle handlebar stem in integrity without wasting much material.

SUMMARY OF THE INVENTION

The present invention has been accomplished under the circumstances in view. According to the present invention, the handlebar stem fabrication method includes the steps of (a) selecting a metal ingot subject to the cavity of a first forming die and then operating the first forming die to process the selected metal ingot into an embryonic form having a front end section, (b) operating a second forming die to process the embryonic form into an initially processed form having a middle body section integral with the front end section, (c) operating a third forming die to process the initially processed form into a secondarily processed form having a hollow rear end with a closed bottom wall and a rear end lug raised from the periphery of the hollow rear end, and (d) processing the secondarily processed form to form a finished handlebar stem by: cutting the closed bottom wall away from the hollow rear end of the secondarily processed form, making a split at the hollow rear end of the secondarily processed form to separate the rear end lug into two separated lugs, and then drilling two vertically spaced mounting holes at the two separated lugs. Because the size of the metal ingot is calculated subject to the cavity of the bottom die of the first forming die, less waste material is produced when a bicycle handlebar stem is finished.

DETAILED DESCRIPTION OF THE PREFERRED EMBODIMENT

Figure 1:
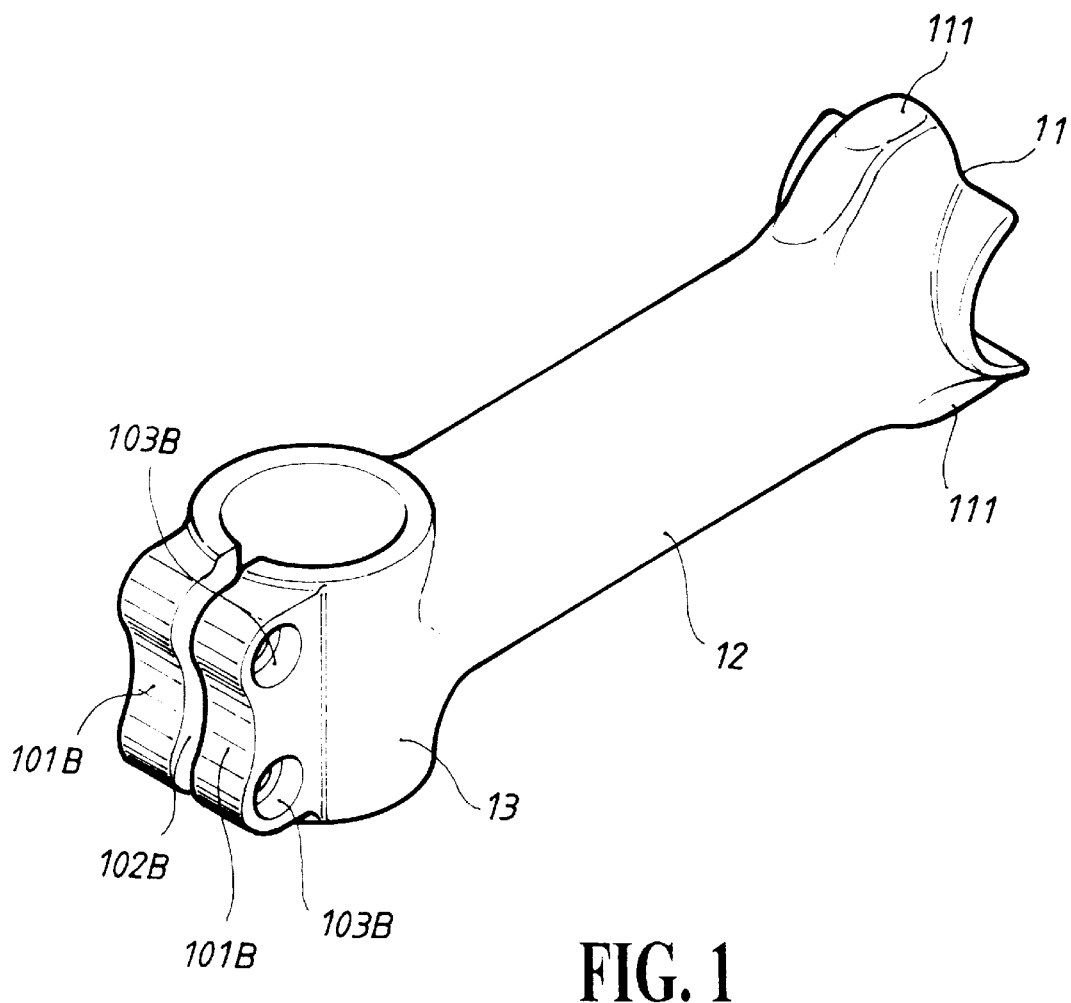
FIG. 1 is a perspective view of a handlebar stem fabricated according the present invention.

FIG. 1 shows a handlebar stem fabricated according to the present invention. The handlebar stem fabrication method of the present invention includes four processing steps to forge the front end section 11, the middle body section 12 and the rear end section 13 of the handlebar stem. These four processing steps are outlined hereinafter.

I. First Processing Step

Figure 2:
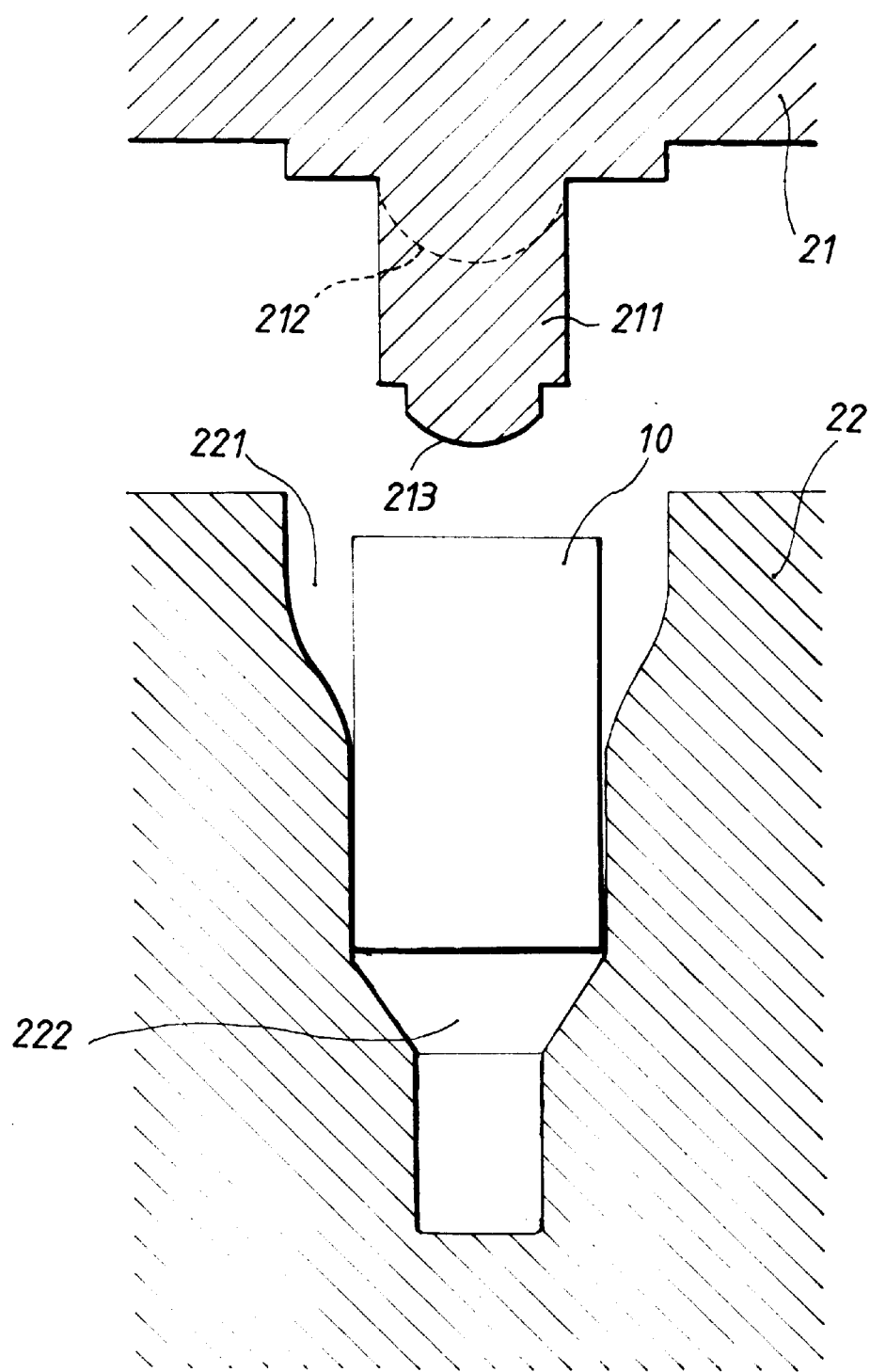
FIG. 2 is a schematic drawing showing a metal ingot put in the cavity of the bottom die of the first forming die according to the first fabrication step of the present invention.
Figure 3:
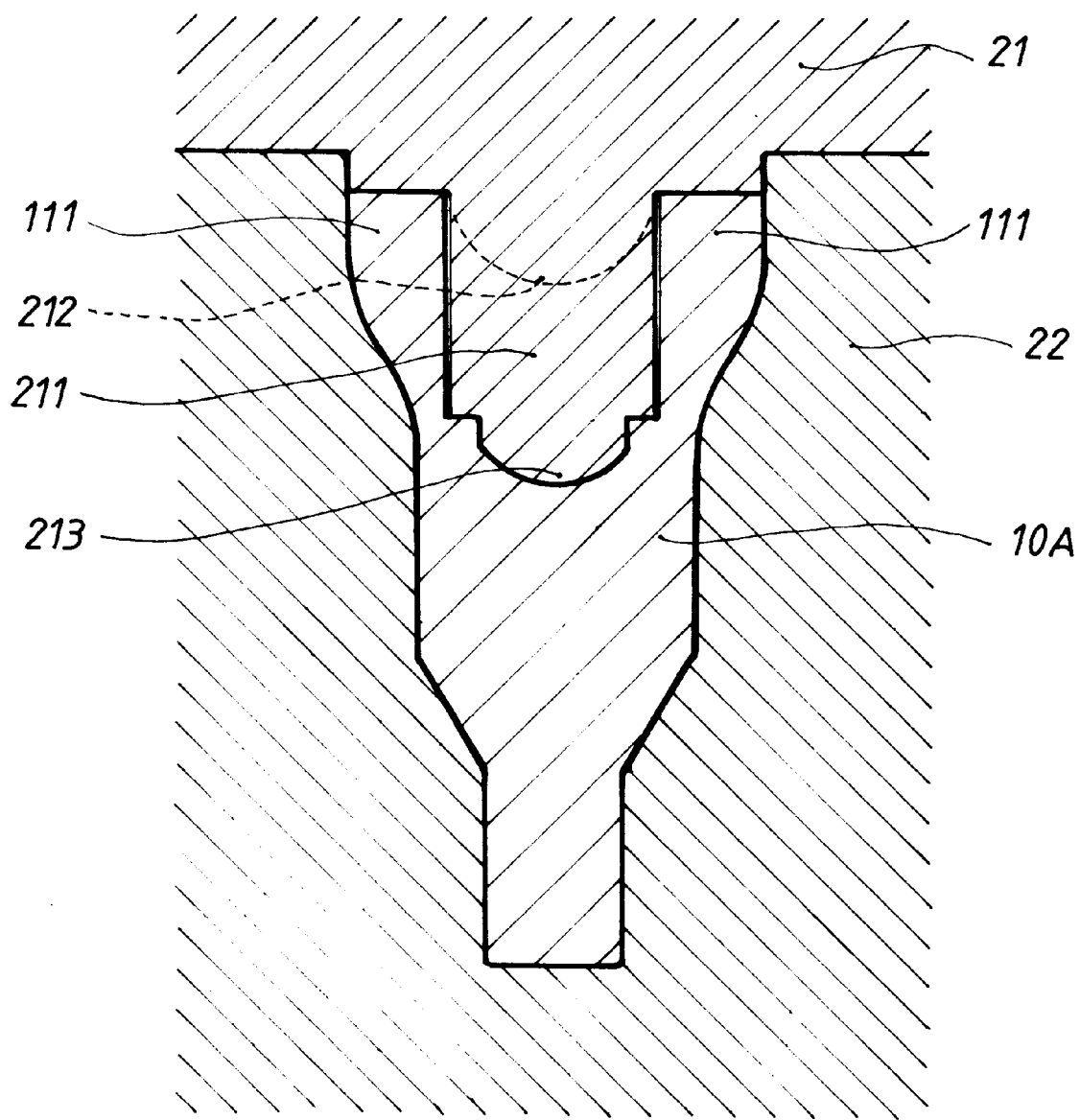
FIG. 3 is a schematic drawing showing the plunger of the upper die of the first forming die forced into the cavity of the corresponding bottom die, the metal ingot is squeezed according to the first fabrication step of the present invention.

As shown in FIGS. 2 and 3 and FIG. 1 again, a selected metal (aluminum) ingot 10 is put in a first forming die and forged into an embryonic form 10A. The mold is comprised of a bottom die (female die) 22, and an upper die (male die) 21. The bottom die 22 has a cavity formed of an expanded mouth 221 and a conical chamber 222. The expanded mouth 221 is for molding a part of the metal ingot 10 into the front end section 11 with two projecting portions 111. The conical chamber 222 is for molding a part of the metal ingot 10 into a raw base for the middle body section 12 and the rear end section 13. The upper die 21 comprises a stepped plunger 211 raised from the bottom side thereof for plugging into the cavity of the bottom die 22 to forge the metal ingot 10 into the aforesaid embryonic form 10A. The stepped plunger 211 comprises two smoothly curved convex portions 212 raised from two opposite lateral sides thereof, and a bottom extension 213. When the stepped plunger 211 is forced into the cavity of the bottom die 22, the metal ingot 10 is forged into the aforesaid embryonic form 10A having one end shaped like the front end section 11. The metal ingot 10 is shaped like a bar having a size calculated subject to the cavity of the bottom die 22. The outer diameter of the stepped plunger 211 is smaller than the metal ingot 10, so that the metal ingot 10 can be squeezed bilaterally upwards to form the front end section 11 and the projecting portions 111 at two opposite sides of the front end section 11 when the stepped plunger 211 is forced into the cavity of the bottom die.

II. Second Processing Step

Figure 4:
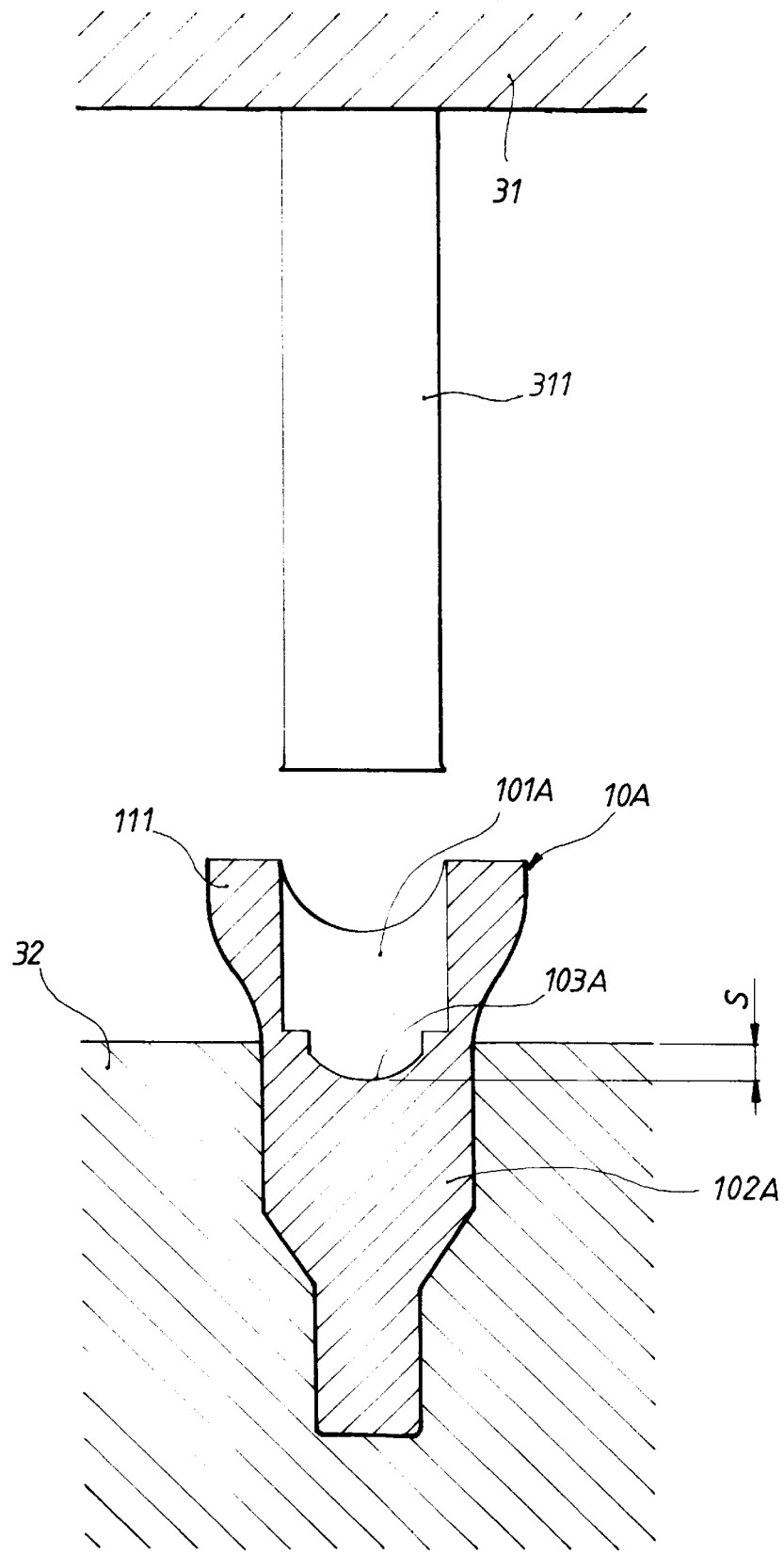
FIG. 4 is a schematic drawing showing the embryonic form put in the cavity of the bottom die of the second forming die according to the second fabrication step of the present invention.
Figure 5:
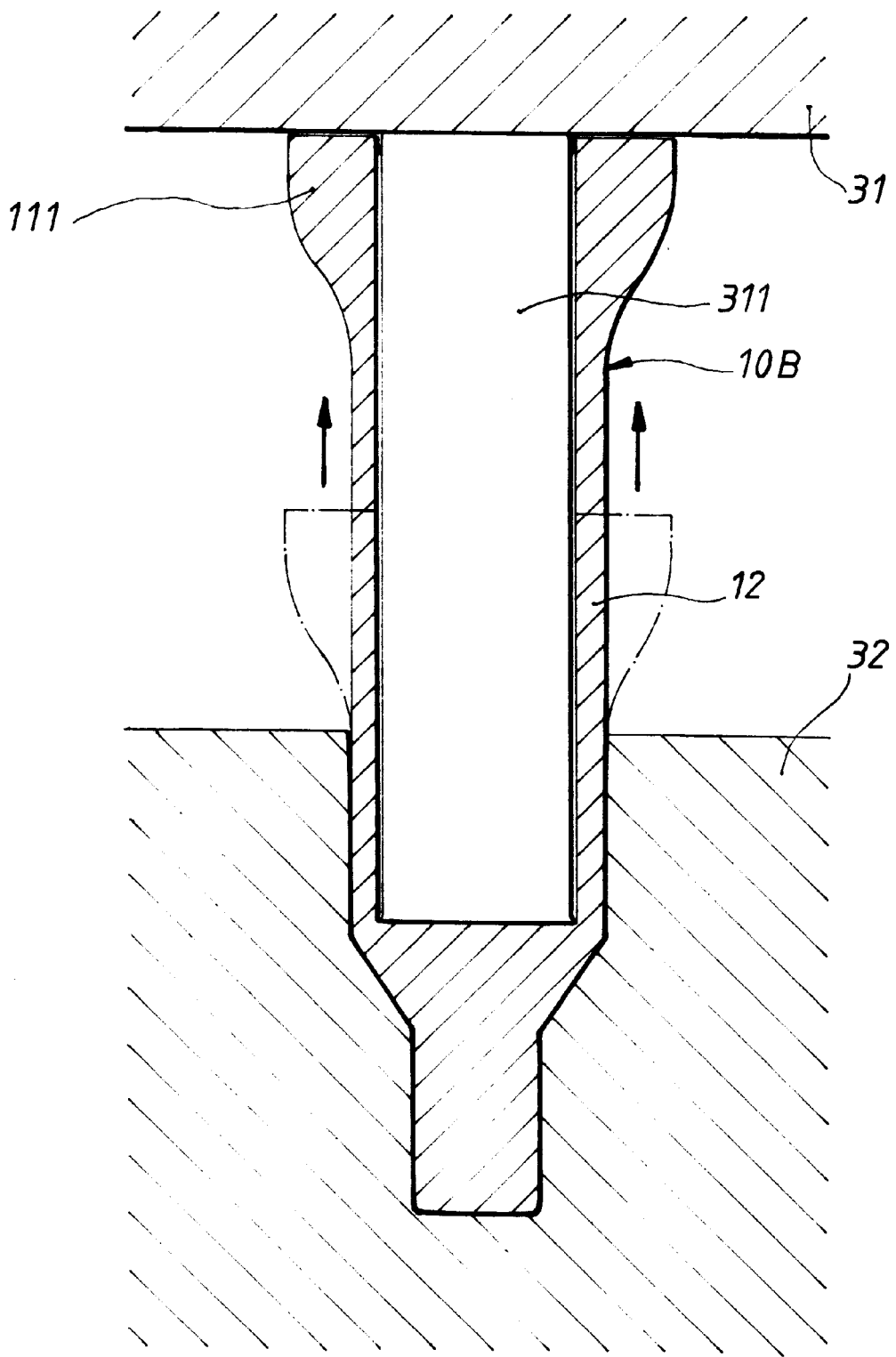
FIG. 5 is a schematic drawing showing the downward rod of the upper die of the second forming die plugged into the inner hole of the embryonic form according to the second fabrication step of the present invention.
Figure 6:
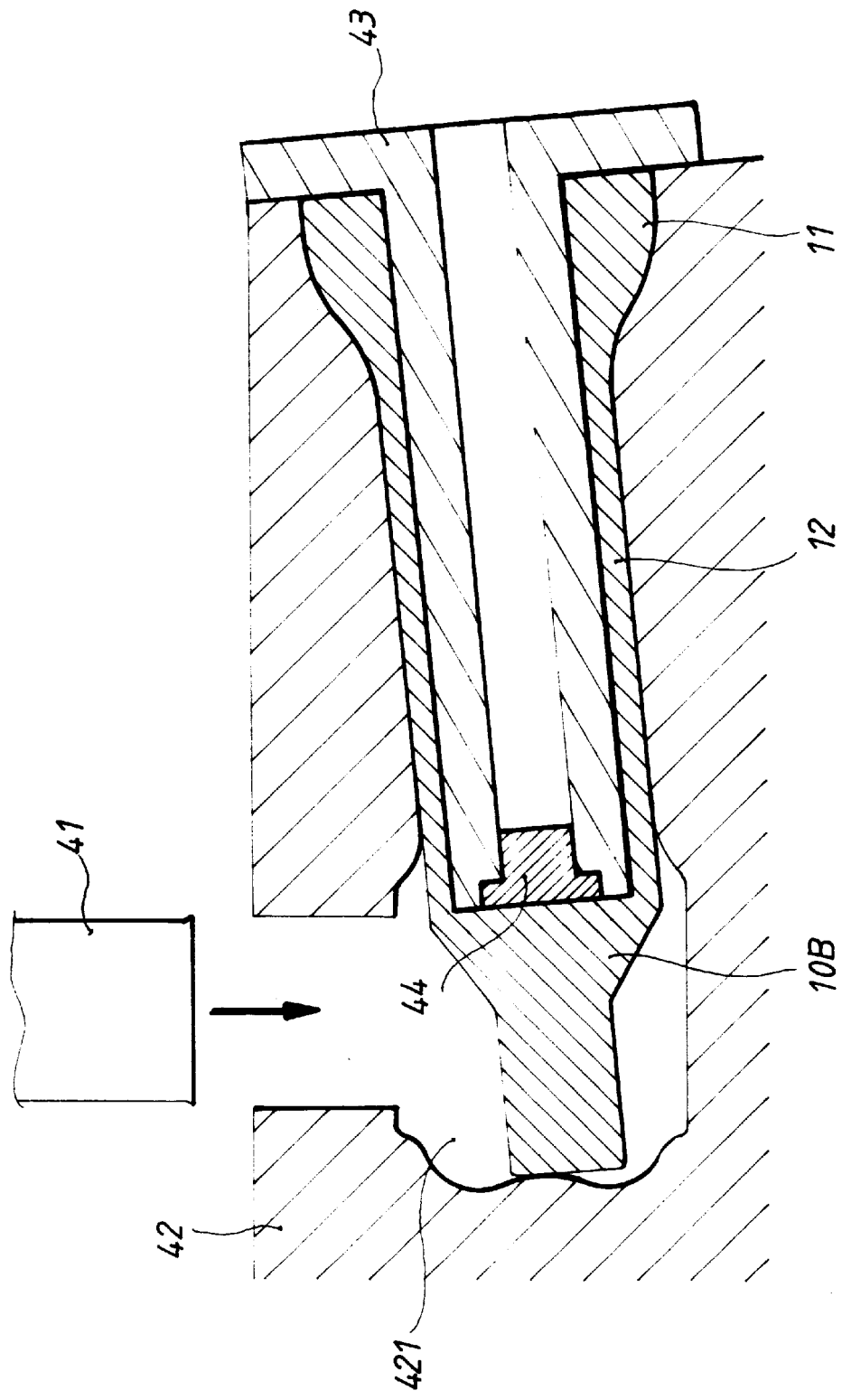
FIG. 6 is a schematic drawing showing the initially processed form put in the cavity of the bottom die of the third forming die, the auxiliary die is inserted into the initially processed form according to the third fabrication step of the present invention.
Figure 7:
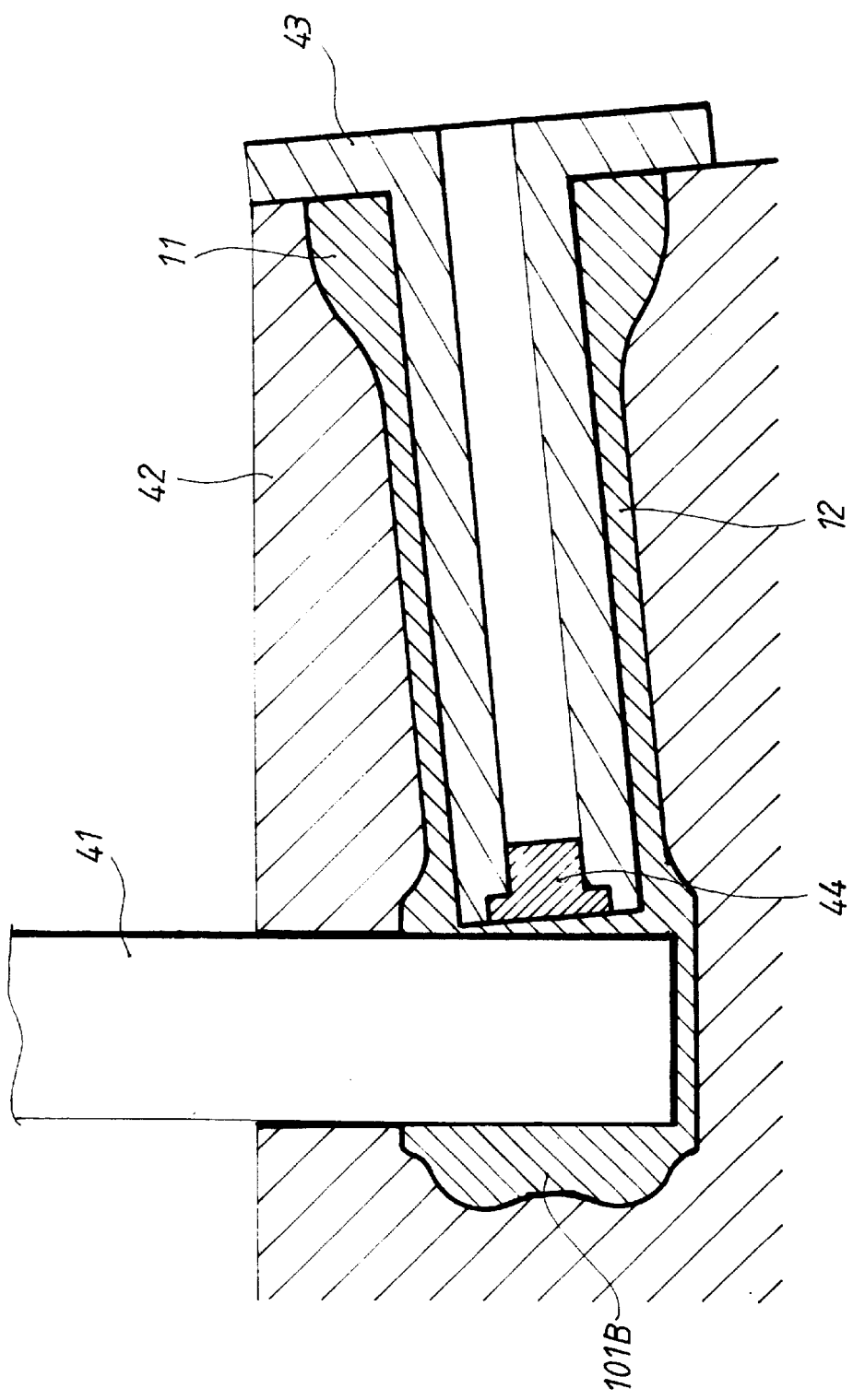
FIG. 7 is similar to FIG. 6 but showing the upper die of the third forming die plugged into the cavity of the corresponding bottom die.
Figure 8:
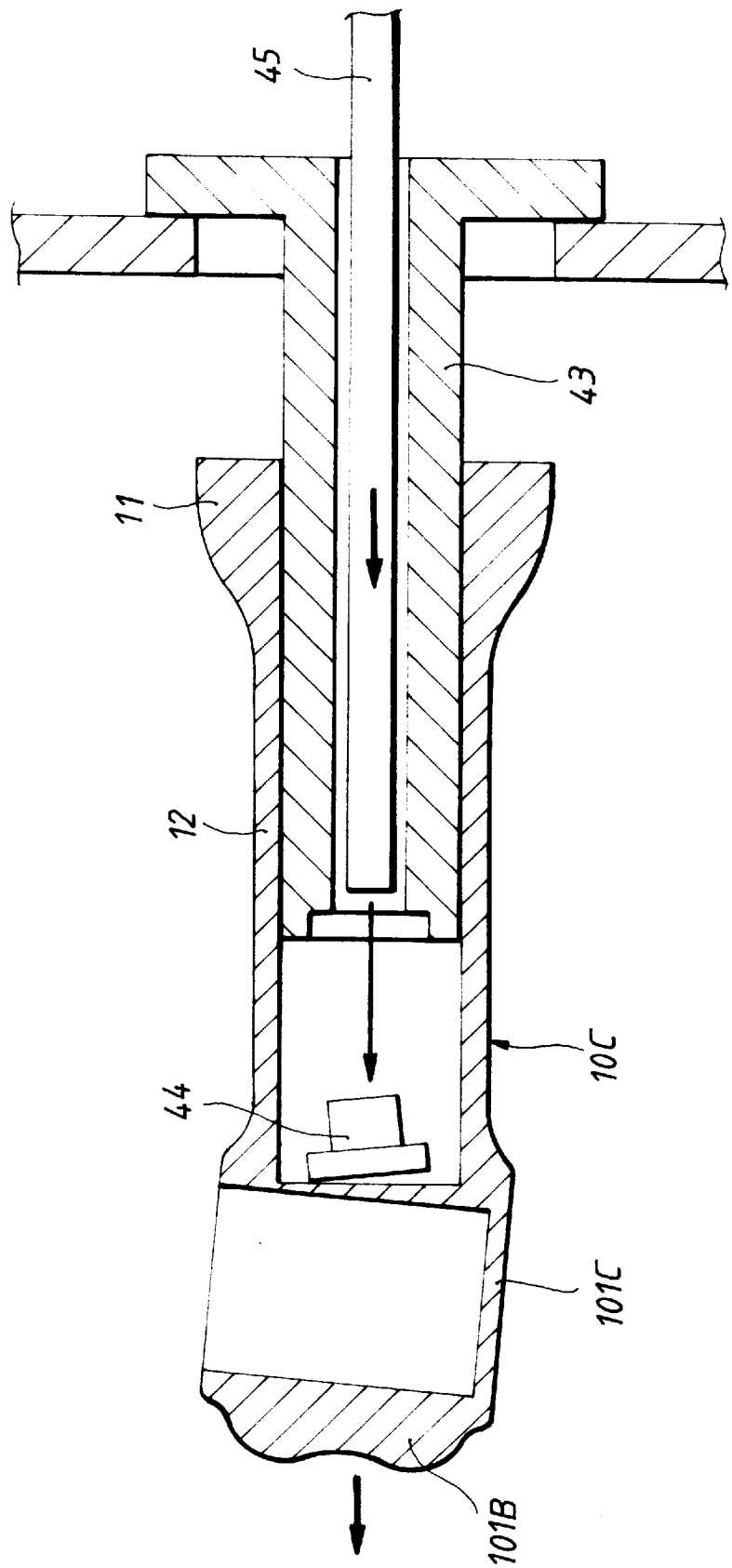
FIG. 8 is similar to FIG. 7 but showing the auxiliary die removed from the secondarily processed form.

Referring to FIG. 4 and 5, the embryonic form 10A thus obtained is then put in a second forming die, which is comprised of a bottom die 32 and an upper die 31 having a downward rod 311 (see FIG. 4), and then processed into an initially processed form 10B. When the embryonic form 10A is put in the cavity of the bottom die 32, the front end section 11 protrudes over of the top side of the bottom die 32. The downward rod 311 of the upper die 31 has a diameter approximately equal to the inner diameter of the inner hole 101A of the embryonic form 10A, therefore the embryonic form 10A is processed into an initially processed form 10B by the bottom die 32 and the upper die 31, and the middle solid part 102A of the embryonic form 10A is processed into the desired middle body section 12 by drop forging (see FIG. 5).

During the aforesaid second processing step, the inner hole 101A of the embryonic form 10A has a bottom wall 103A disposed at a lower elevation vertically spaced from the top side of the bottom die 32 by a height difference S, so that the embryonic form 10A can be processed into the desired middle body section 12 subject to the desired length.

III. Third Processing Step

Referring to FIGS. from 6 through 9, the initially processed form 10B thus obtained is then put in a third forming die, which is comprised of a bottom die (female die) 42 having a cavity 421, and auxiliary die 43, and an upper die (male die) 41. The initially processed form 10B is transversely inserted into the cavity 421 inside the bottom die 42. The auxiliary die 43 is a hollow member, having a stopper 44 fastened to one end of a stepped longitudinal center through hole thereof. After the initially processed form 10B has been transversely put in the cavity 421 inside the bottom die 42, the auxiliary die 43 is inserted into the initially processed form 10B, then the upper die 41 is operated to process the initially processed form 10B into a secondarily processed form 10C having a hollow rear end and a rear end lug 101B raised form the periphery of the hollow rear end, and then a push rod 45 is inserted into the auxiliary die 43 to push the stopper 44 away from the auxiliary die 43, enabling the auxiliary die 43 to be removed from the secondarily processed form 10C. Because the hollow rear end of the secondarily processed form 10C has a closed bottom wall 101C, the upper die 41 does not directly touch the bottom die 42 during processing (direct contact between the upper die 41 and the bottom die 42 may cause the dies 41, 42 to be damaged.

IV. Fourth Processing Step

Figure 9:
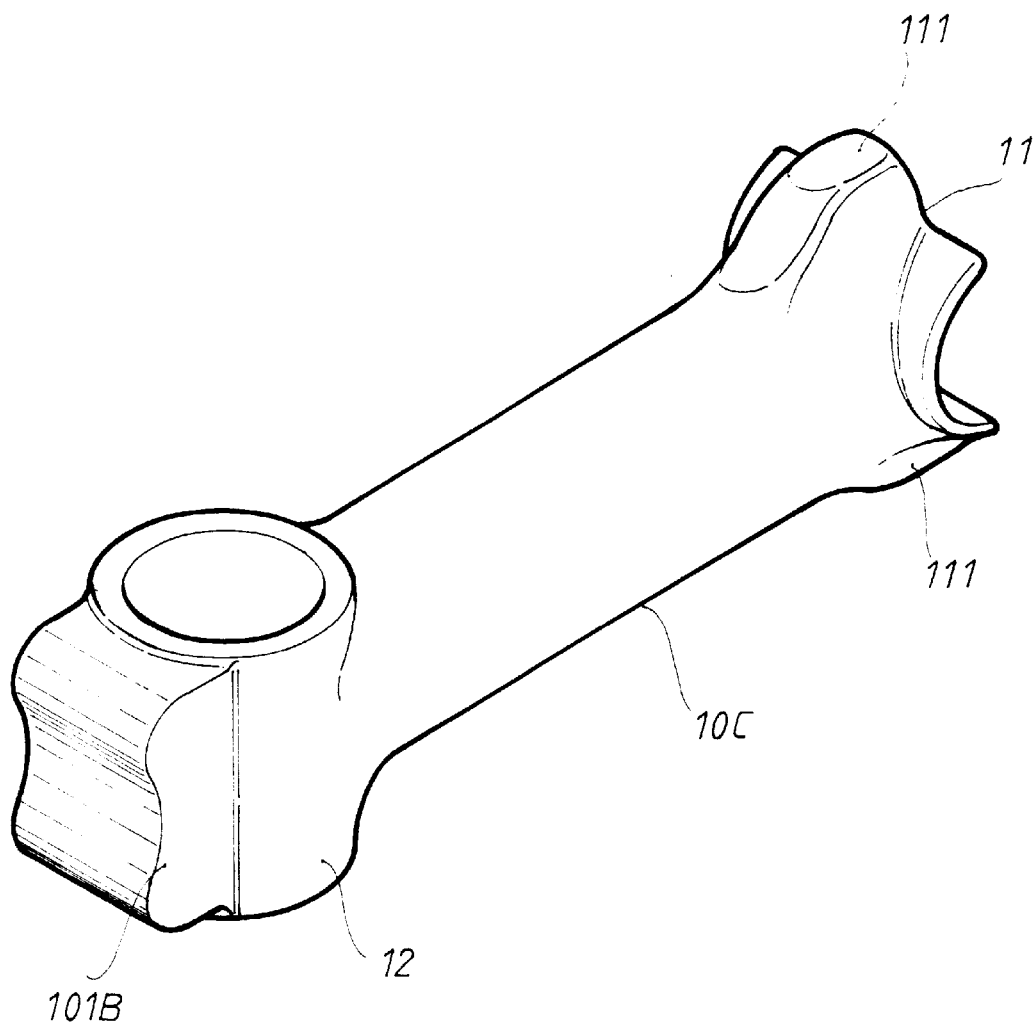
FIG. 9 is a perspective view of a secondarily processed form according to the present invention.

Referring to FIGS. 1 and 9 again, the secondarily processed form 10C is then processed into the desired finished handlebar stem by: cutting the closed bottom wall 101C away from the form 10C, making a split 102B at the rear end of the form 10C to separate the rear end lug 101B into two separated halves, and then drilling two vertically spaced mounting holes 103B at the two separated lugs 101B. After the removal of the closed bottom wall 101C, a through hole is defined within the rear end section 13 of the finished handlebar stem for receiving a bicycle head tube. The front end section 11 is fastened with a mounting plate to a bicycle handlebar. When the rear end section 13 of the finished handlebar stem is mounted on the head tube of a bicycle, screw bolts are respectively fastened to the mounting holes 10B to close the split 102B and to firmly secure the handlebar stem in place.

Because the metal ingot used is precisely calculated subject to the cavity of the first forming die, less waste material is produced. According to actual practice, the invention needs only 180 g metal ingot to make a handlebar stem while conventional methods require about 450 g metal ingot to make one of the same specification.

It is to be understood that the drawings are designed for purposes of illustration only, and are not intended as a definition of the limits and scope of the invention disclosed.

What the invention claimed is:

1. A handlebar stem fabrication method comprising:
 i) preparing a first forming die, which is comprised of a bottom die having a cavity formed of an expanded mouth and a conical chamber, and an upper die having a stepped bottom plunger, then selecting a metal material block, and then putting the selected metal material block in the cavity of the bottom die of said first forming die and operating said first forming die to let the metal material block to be processed by said expanded mouth into a front end section with two projecting portions and by said conical chamber into a raw base, so as to obtain an embryonic form having an inner hole;
 ii) preparing a second forming die, which is comprised of a bottom die having a cavity and an upper die having a downward rod, then putting the embryonic form thus obtained in the cavity of the bottom die of said second forming die, and then operating said second forming die to process said embryonic form into an initially processed form having a middle body section integral with the front end section;
 iii) preparing a third forming die, which is comprised of a bottom die having a cavity, a hollow auxiliary die having a stepped longitudinal center through hole and a stopper at one end of said stepped longitudinal center through hole, and an upper die, then putting the initially processed form thus obtained in the cavity of the bottom die of said third forming die, and then inserting said auxiliary die into said initially processed form and then operating said third forming die to process said initially processed form into a secondarily processed form having a hollow rear end with a closed bottom wall and a rear end lug raised from the periphery of the hollow rear end, and then inserting a push rod into said hollow auxiliary die and to remove said auxiliary die from said secondarily processed form; and
 iv) processing the secondarily processed form thus obtained into a finished handlebar stem by: cutting the closed bottom wall away from the hollow rear end of said secondarily processed form, making a split at the hollow rear end of said secondarily processed form to separate said rear end lug into two separated lugs, and then drilling two vertically spaced mounting holes at the two separated lugs.

2. The handlebar stem fabrication method of claim 1 wherein said metal material is a metal ingot of size calculated subject to the cavity of the bottom die of said first forming die.

3. The handlebar stem fabrication method of claim 1 wherein the outer diameter of the stepped plunger of the upper die of said first forming die is smaller than the metal material block, so that the metal material block can be squeezed bilaterally upwards to form a front end section and two projecting portion at two opposite sides of the front end section when said stepped plunger is forced into the cavity of the bottom die of said first forming die.

4. The handlebar stem fabrication method of claim 1 wherein the inner hole of said embryonic form has a bottom wall disposed at a lower elevation vertically spaced from a top side of the bottom die of said second forming die by a height difference during processing, so that said embryonic form can be processed into the desired middle body section subject to the desired length.

5. The handlebar stem fabrication method of claim 1 wherein the closed bottom wall of the hollow rear end of said secondarily processed form prohibits direction contact between the upper die and the bottom die of said third forming die during processing.

\* \* \* \* \*